(12) United States Patent
Trocki

(10) Patent No.: US 10,944,841 B2
(45) Date of Patent: Mar. 9, 2021

(54) SERVER-DRIVEN NOTIFICATIONS TO MOBILE APPLICATIONS

(71) Applicant: Red Hat, Inc., Raleigh, NC (US)

(72) Inventor: Wojciech Trocki, Waterford City (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/115,772

(22) Filed: Aug. 29, 2018

(65) Prior Publication Data

US 2020/0076913 A1 Mar. 5, 2020

(51) Int. Cl.
*H04L 29/08* (2006.01)
*G06F 3/0481* (2013.01)

(52) U.S. Cl.
CPC ............ *H04L 67/26* (2013.01); *G06F 3/0481* (2013.01)

(58) Field of Classification Search
CPC ........ H04L 67/26; H04L 51/24; G06F 3/0481
See application file for complete search history.

(56) References Cited

U.S. PATENT DOCUMENTS

| | | | |
|---|---|---|---|
| 8,914,449 B2 | 12/2014 | Gaddam et al. | |
| 9,232,339 B2 | 1/2016 | Lynes et al. | |
| 9,823,909 B1 | 11/2017 | Kuo et al. | |
| 2012/0210415 A1* | 8/2012 | Somani | H04L 63/0884 726/9 |
| 2012/0322470 A1* | 12/2012 | Said | G06Q 10/107 455/466 |
| 2012/0324041 A1* | 12/2012 | Gerber | H04W 52/0238 709/217 |
| 2014/0229880 A1* | 8/2014 | Aradhye | G06Q 10/107 715/771 |
| 2015/0082212 A1* | 3/2015 | Sharda | H04L 67/26 715/764 |
| 2015/0127750 A1* | 5/2015 | Kumar | H04L 67/26 709/206 |
| 2015/0207893 A1 | 7/2015 | Lee | |
| 2016/0086241 A1* | 3/2016 | Proulx | H04L 67/26 705/26.4 |
| 2016/0241659 A1 | 8/2016 | Wessendort Matthias | |
| 2016/0315902 A1* | 10/2016 | Silva | H04W 4/21 |

(Continued)

OTHER PUBLICATIONS

Gudla, Suresh Kumar, et al., "A Unified Push Notifications Service for Mobile Devices", Web Solutions, Samsung R&D Institute India, Bangalore, India, https://ieeexplore.ieee.org/abstract/document/7383922/, IEEE 2015, 6 pages.

(Continued)

*Primary Examiner* — Tonia L Dollinger
*Assistant Examiner* — Jihad K Boustany
(74) *Attorney, Agent, or Firm* — Lowenstein Sandler LLP

(57) ABSTRACT

An example method of implementing server-driven notifications to mobile applications may include: receiving, by a mobile computing device, a message from a notification server, wherein the message comprises a payload identifying a mobile application running on the mobile computing device; translating the payload into a local notification including an identifier of the mobile application; causing the local notification to be displayed on the mobile computing device; and responsive to receiving a user interface event associated with the local notification, processing the user interface event by a handler of the mobile application.

18 Claims, 6 Drawing Sheets

(56) References Cited

U.S. PATENT DOCUMENTS

2016/0353409 A1* 12/2016 Chen ................. H04M 1/72561
2017/0126609 A1*  5/2017 Sharifi .................... H04L 51/24
2019/0278378 A1*  9/2019 Yan ...................... G06N 3/0481

OTHER PUBLICATIONS

Esposito, Dino, "Cutting Edge—Pushing Notification to Mobile Apps", Developer Network Magazine (https):/msdn.microsoft.com/en-us), vol. 31, No. 4, Apr. 2016, 11 pages.
Murph, Darren, "Amazon Aims to Unify Push Notifications Across App Platforms with SNS Service", https://www.engadget.com/2013/08/13/amazon-unify-push-notifications-across-app-platforms-sns/, Aug. 13, 2013, 15 pages.

* cited by examiner

SERVER-DRIVEN NOTIFICATIONS TO MOBILE APPLICATIONS

TECHNICAL FIELD

The present disclosure is generally related to communication systems and more specifically related to server-driven notifications to mobile applications.

BACKGROUND

"Push notification" herein refers to a message transmitted by a server to a mobile computing device without a specific request from the device.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Push notifications may be triggered by external events, generated by application servers, and translated into one or more commonly accepted formats by push notification servers which may transmit the messages to mobile computing devices. A push notification message may be displayed by the device even if the mobile application to which the message is addressed is not active (e.g., running in the background or sleeping) at the time of receiving the push notification. In conventional systems, each application installed on a mobile device should be individually configured and registered with a push notification server in order to receive push notifications.

Aspects of the present disclosure address the above and other deficiencies by providing systems and methods for implementing server-driven notifications to mobile applications, in which a mobile computing device, rather than individual mobile applications, is registered with a notification server, thus enabling the notifications to be addressed to the mobile computing device rather than to individual applications. In certain implementations, the device management application running on the mobile computing device registers the mobile computing device with a notification server and is responsible for receiving and processing mobile notifications that may eventually be transmitted by the notification server to the mobile computing device. In an illustrative example, responsive to receiving a message transmitted by the notification server, the device management application may translate the message payload into one or more application-specific local notifications to be displayed by the mobile computing device. The local notifications may be displayed by the mobile computing device in accordance with the local notification properties specifying the text, image, color, sound, etc.

In an illustrative example, the user may respond to a local notification. Responsive to detecting a GUI event associated with the displayed local notification, the device management application may invoke a corresponding event handler (e.g., onTouch( )) and supply one or more parameters which are encoded by the local notification (such as the URI for launching the associated mobile application), thus causing the mobile application to be launched or awakened.

In certain implementations, the local notifications implemented in accordance with one or more aspects of the present disclosure may be utilized for implementing workflows which coordinate two or more mobile applications running on the mobile computing device, as described in more detail herein below.

Figure 1:
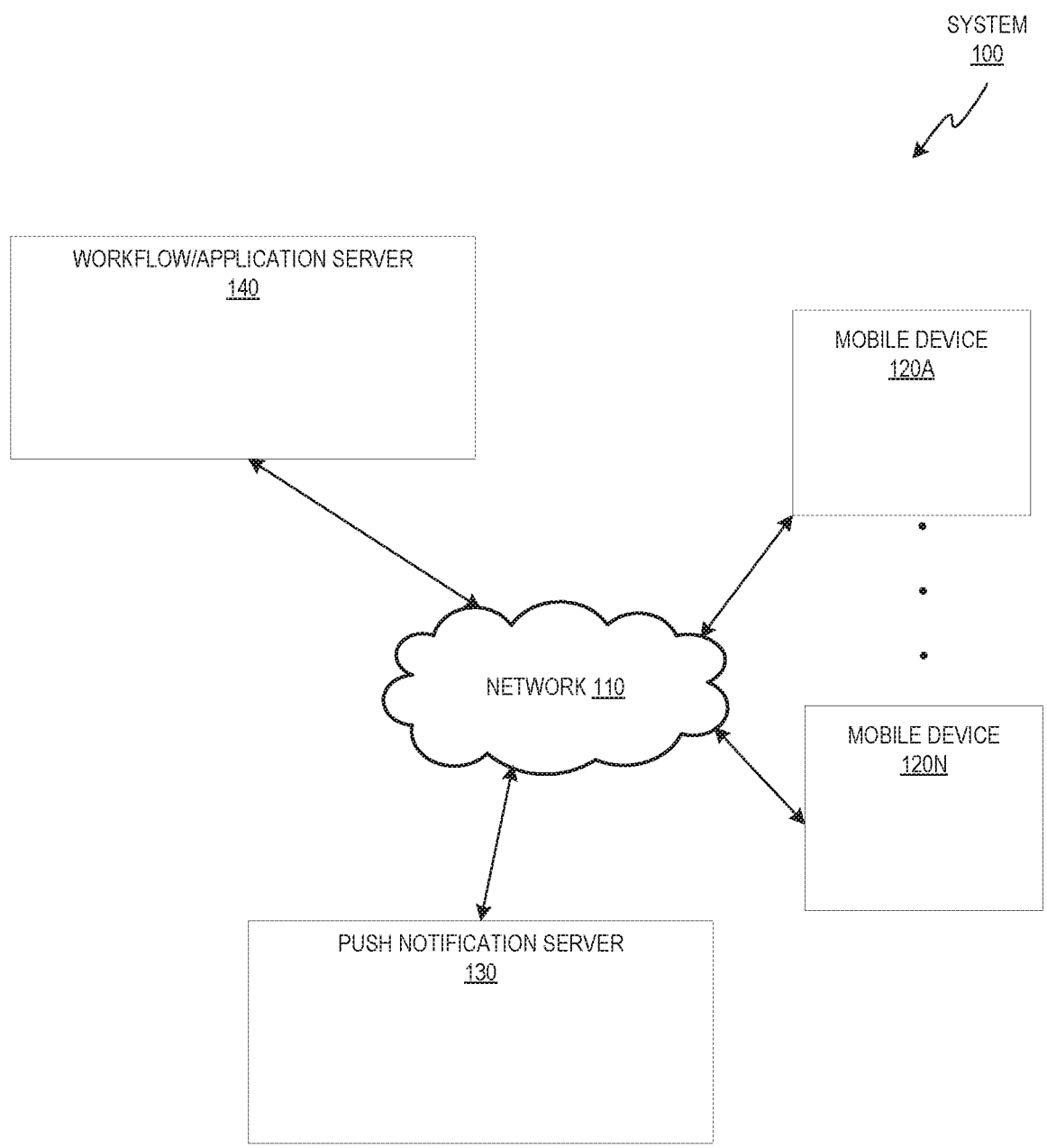
FIG. 1 depicts a push notification system operating in accordance with one or more aspects of the present disclosure.

FIG. 1 depicts a push notification system operating in accordance with one or more aspects of the present disclosure. System 100 may include mobile computing devices 120A-120N in communication with the push notification server 130 over the network 110. System 100 may further include the workflow/application server 140 which running one or more server-side applications and/or workflows which generate the push notifications to be delivered to the mobile computing devices 120. Network 110 may be provided by a public network (e.g., Internet), a private network (e.g., local area network (LAN) or wide area network (WAN)), a wired network (e.g., Ethernet), a wireless network, a cellular network, or a combination thereof. The push notification server 130 may implement push notifications which are compatible with one or more mobile application platforms (e.g., iOS®, Android®, etc.).

Figure 2:
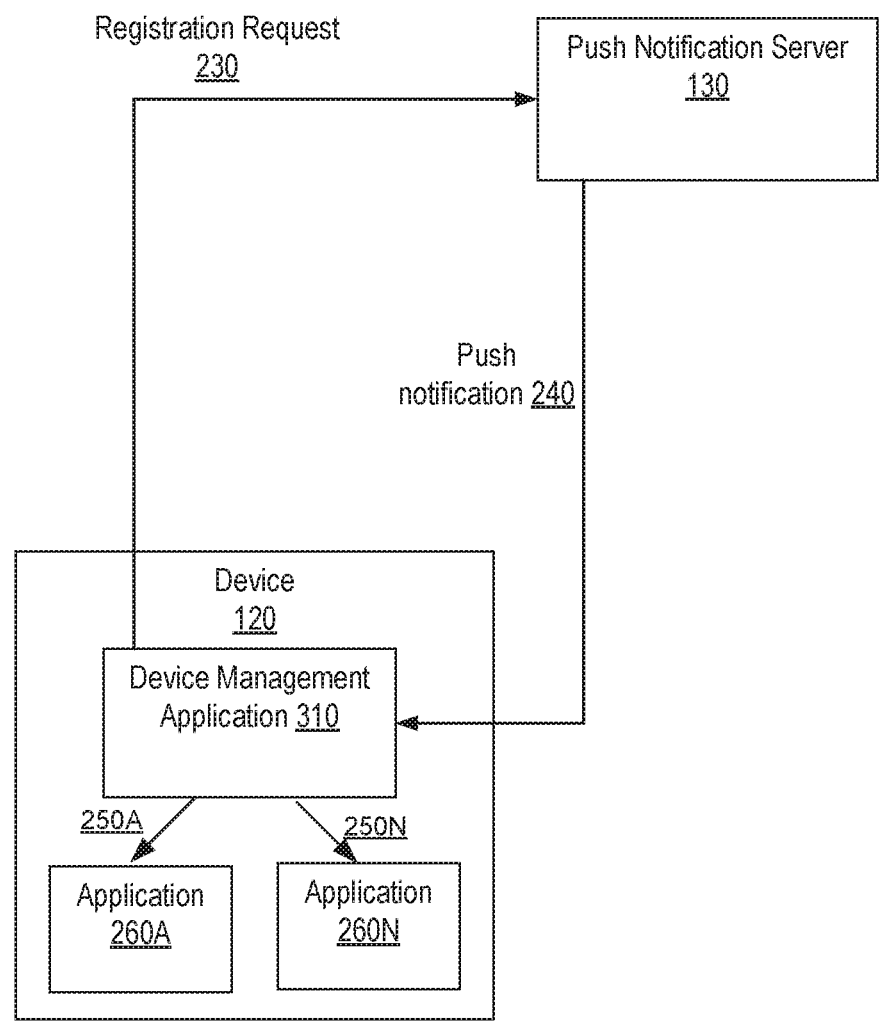
FIG. 2 schematically illustrates an example interaction diagram for implementing server-driven notifications in accordance with one or more aspects of the present disclosure.

Mobile device 120 may be employed to run one or more mobile applications (e.g., communication applications, business applications, navigation applications, health applications, gaming applications, etc.). Additionally, mobile device 120 may run a device management application, which may be effectively "invisible" for the user of the mobile device 120, in that the device management application may have no user interface or user-modifiable configuration parameters. In certain implementations, the device management application may be installed and/or configured by the mobile service provider or the enterprise system administrator. The device management application may register with the push notification server 130. Responsive to receiving a message transmitted by the notification server, the device management application may translate the message payload into one or more application-specific local notifications to be displayed by the mobile computing device, as described in more detail herein below with references to FIG. 2, which schematically illustrates an example interaction diagram for implementing server-driven notifications in accordance with one or more aspects of the present disclosure.

In order to receive push notifications from the push notification server 130, the device management application 210 of the mobile computing device 120 may register with the push notification server 130 by transmitting the device registration request 230. The request 230 may comprise the device identifier (e.g., the subscriber identifier or another unique identifier of the device 120), one or more notification types to be received, and/or various other information items that may facilitate the delivery of push notifications to the device 120. Unlike the common push notification implementations, the registration request specifies the mobile device identifier rather than identifiers of individual mobile applications running on the mobile computing device 120.

Responsive to receiving a push notification 240, the device management application 210 may process the payload of the notification in order to generate one or more local notifications 250A-250N addressed to mobile applications 260A-260N running on the mobile computing device 120. In certain implementations, the payload may be encoded in JavaScript Object Notation (JSON) format and/or any other format supported by the device management application 210. The payload may include the application identifier (e.g., the Unified Resource Identifier (URI)) which may be utilized to launch the application. The payload may further include the notification properties, such as the text and/or image to be displayed by the mobile computing device, the sound to be reproduced by the mobile computing device, the vibration pattern to be reproduced by the mobile computing device, etc. The payload may further specify one or more handlers (i.e., mobile application functions) to be utilized by the mobile applications for processing specified application-specific events (e.g., GUI events). The payload may further include identifier of an application-specific event to be detected and reported back to the workflow server, as described in more detail herein below.

The device management application 210 may translate the payload of the notification 250 into one or more local notifications 250A-250N addressed to mobile applications 260A-260N running on the mobile computing device 120. The translation process may include parsing the payload and invoking one or more local application programming interface (API) calls for each object extracted from the payload. In an illustrative example, the device management application may maintain a data structure mapping an object type (of an object extracted from the payload) to an API call identifier and further mapping additional extracted objects to the API call parameters. The translation process may produce one or more local notifications. Each local notification may include the application identifier (e.g., the URI), the notification properties, one or more handlers to be utilized by the mobile applications for processing specified application-specific events (e.g., GUI events), and/or an identifier of an application-specific event to be detected and reported back to the workflow server.

One or more local notifications 250A-250N may be displayed by the mobile computing device 120. The visual presentation of the local notifications (e.g., color, text, pop-up alert, banner notification, icon badge, etc.) may be determined based on the local notification properties encoded by the local notification. In various embodiments, vibrations and/or sound specified by the local notification properties may be reproduced simultaneously with displaying the local notification image and/or text.

The local notification may be displayed irrespective of the running state (running, sleeping, inactive) of the associated mobile application. In an illustrative example, the user may respond to the local notification (e.g., by selecting the push notification). Responsive to detecting a GUI event (e.g., a touch event) associated with the displayed local notification, the device management application 210 may invoke a corresponding event handler (e.g., onTouch( )) specified by the local notification and supply one or more parameters which are encoded by the local notification (such as the URI for launching the associated mobile application), thus causing the mobile application to be launched or awakened.

Alternatively, other actions may be triggered in response to detecting a GUI event associated with a displayed local notification. For example, the local notification may specify the application update information. Accordingly, in response to selection of the displayed local notification, the mobile application may be automatically updated.

In certain implementations, the local notifications implemented in accordance with one or more aspects of the present disclosure may be utilized for implementing workflows which coordinate two or more mobile applications running on the mobile computing device 120. As noted herein above, the push notification payload may include identifier of an application-specific event to be detected and reported back to the workflow server.

Figure 3:
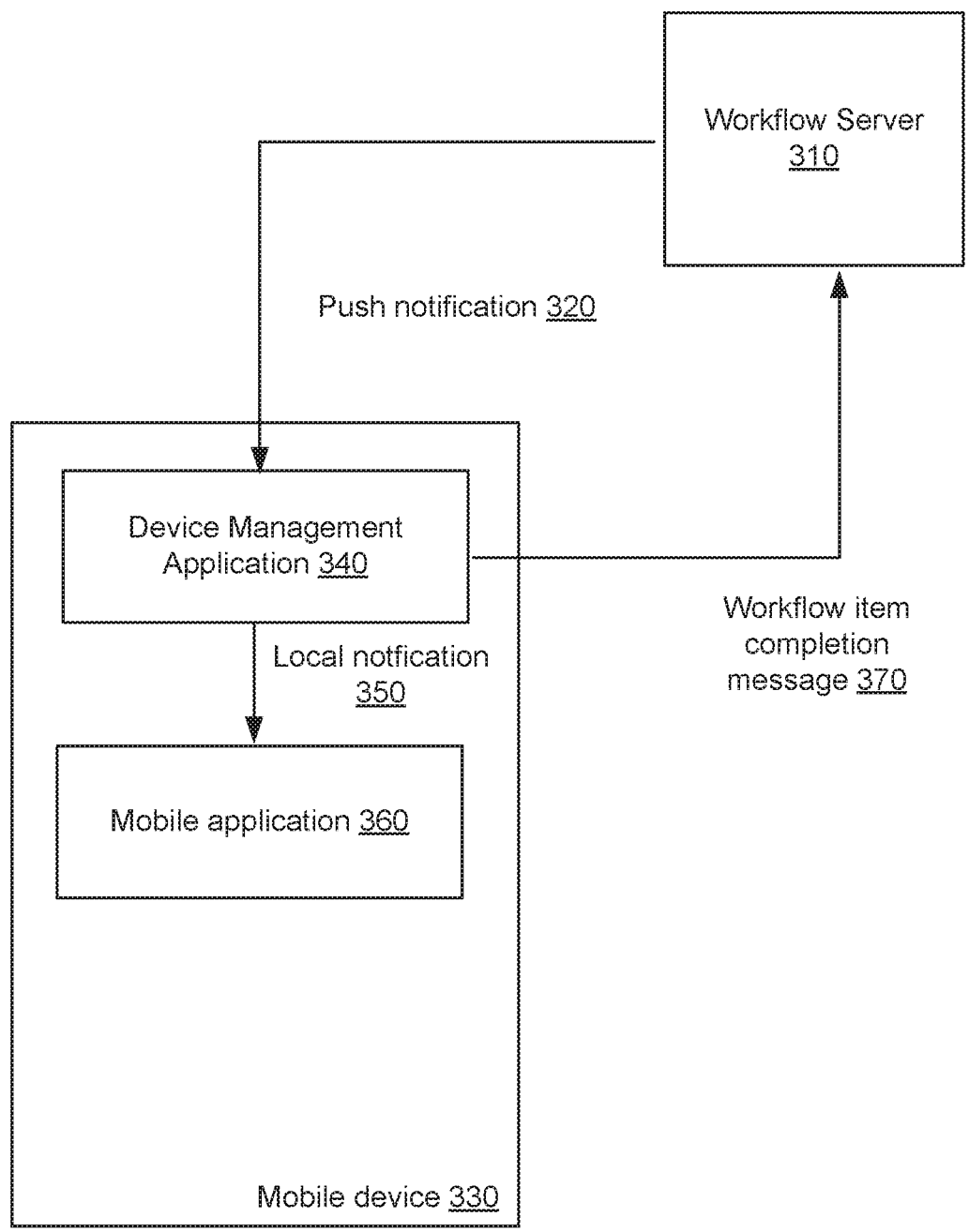
FIG. 3 schematically illustrates an example notification-supported workflow implemented in accordance with one or more aspects of the present disclosure.

FIG. 3 schematically illustrates an example notification-supported workflow implemented in accordance with one or more aspects of the present disclosure. As schematically illustrated by FIG. 3, the workflow server 310 may initiate a push notification 320 to the mobile device 330. Responsive to receiving the push notification 320, the device management application 340 may translate it into a local notification 350 which is addressed to the mobile application 360 running on the mobile device 330. Responsive to detecting the event specified by the local notification 350, the device management application may transmit, to the workflow server, a message 370 reporting the completion of the workflow item. The sequence of events may be repeated multiple times and may involve multiple mobile applications running on the mobile computing device 330, as schematically illustrated by FIG. 4.

Figure 4:
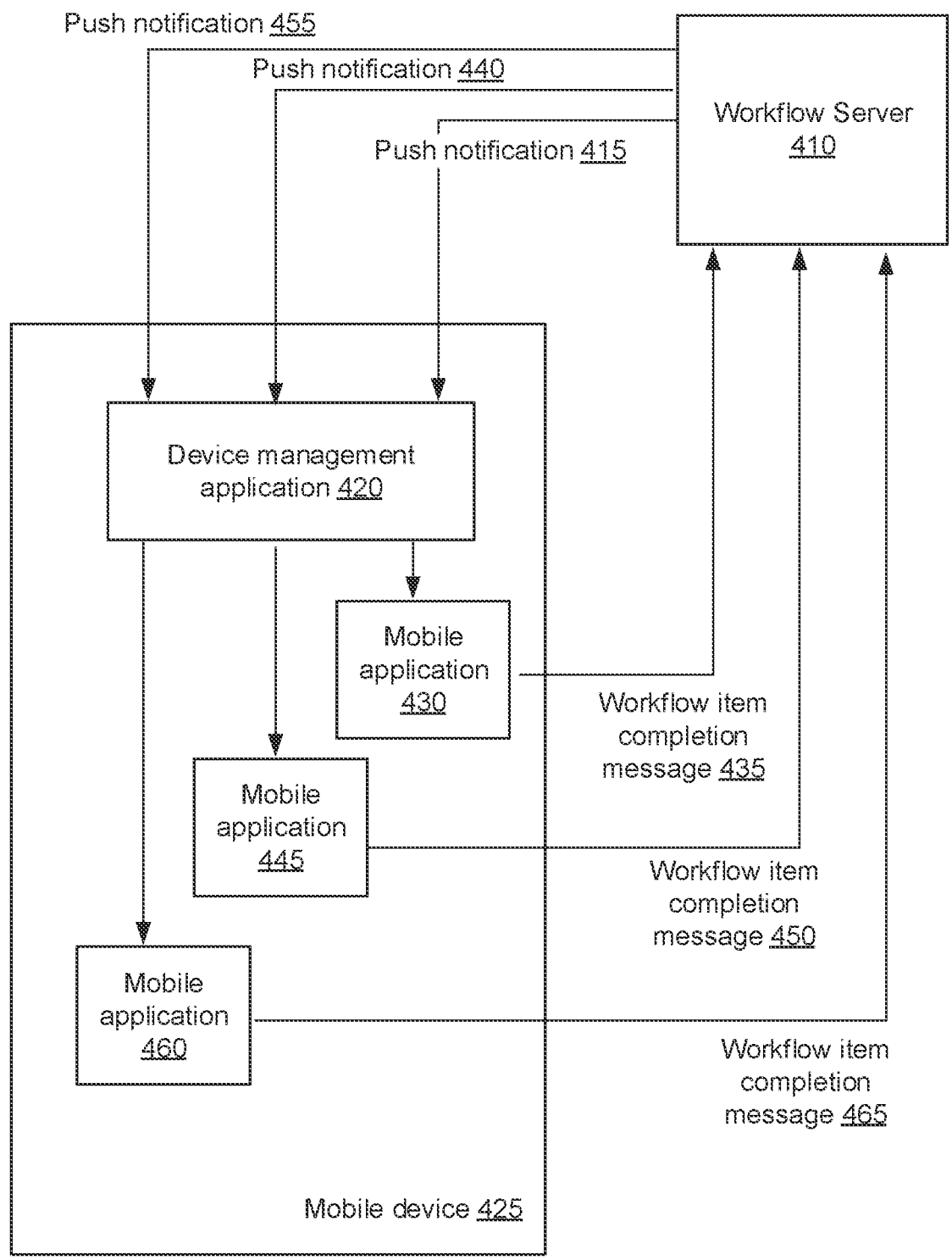
FIG. 4 schematically illustrates an example multi-application workflow implemented in accordance with one or more aspects of the present disclosure.

In the illustrative example of FIG. 4, the workflow server 410 may initiate the example workflow by transmitting a push notification 415 to the device management application 420 of the mobile computing device 425, thus causing mobile application 430 to be launched on the mobile computing device 425. Responsive to detecting the application-specific event (e.g., terminating of the mobile application 430) specified by the push notification 415, the device management application 420 may notify the workflow server 410 by the workflow item completion message 435; in response, the server may transmit a push notification 440 to the mobile computing device 425, thus causing mobile application 445 to be launched on the mobile computing device 425. Responsive to detecting the application-specific event (e.g., terminating of the mobile application 445) specified by the push notification 440, the device management application 420 may notify the workflow server 410 by the workflow item completion message 450; in response, the server may transmit a push notification 455 to the mobile computing device 430, thus causing mobile application 460 to be launched on the mobile computing device 430. Responsive to detecting the application-specific event (e.g., terminating of the mobile application 460) specified by the push notification 455, the device management application 420 may notify the workflow server 410 by the workflow item completion message 465.

Figure 5:
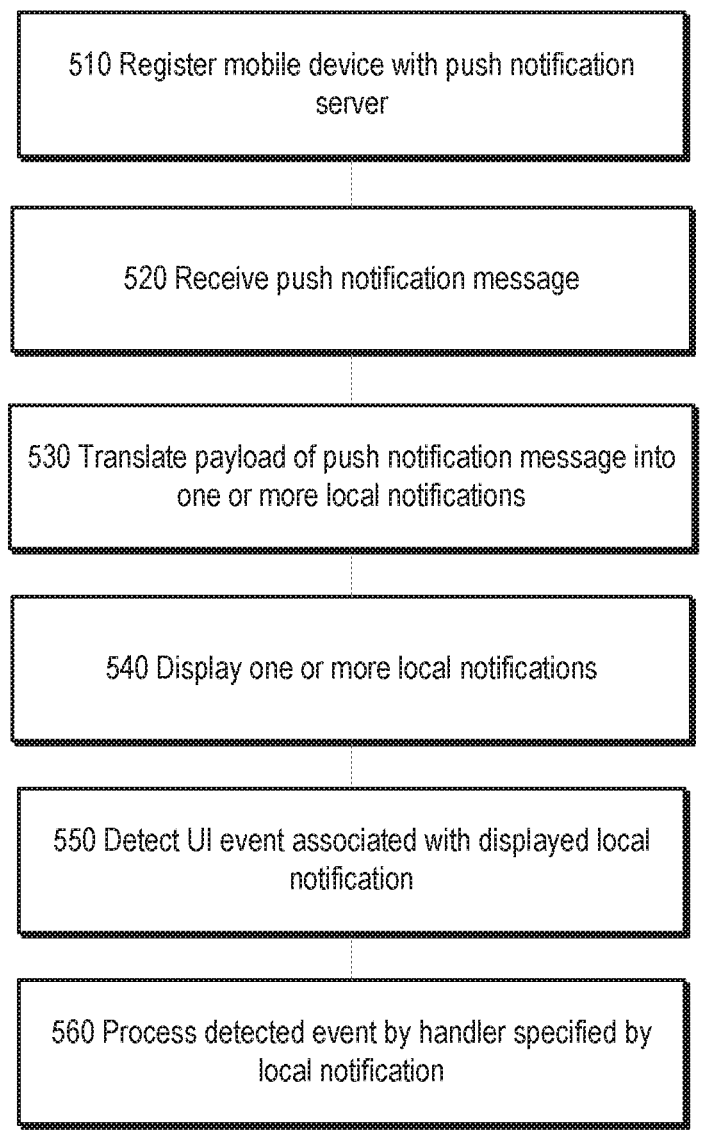
FIG. 5 depicts a flow diagram for method 500 of implementing server-driven notifications to mobile applications, in accordance with one or more aspects of the present disclosure.

FIG. 5 depicts a flow diagram for method 500 of implementing server-driven notifications to mobile applications, in accordance with one or more aspects of the present disclosure. Method 500 may be performed by processing devices that may comprise hardware (e.g., circuitry, dedicated logic, programmable logic, microcode, etc.), executable code (such as is run on a general purpose computer system or a dedicated machine), or a combination of both. Method 500 each of its individual functions, routines, subroutines, or operations may be performed by one or more processors of the computer device executing the method. In certain implementations, method 500 may each be performed by a single processing thread. Alternatively, method 500 may be performed by two or more processing threads, each thread executing one or more individual functions, routines, subroutines, or operations of the method. In an illustrative example, the method 500 may be implemented by the device management application of the mobile computing device 120 of FIG. 1.

Referring to FIG. 5, at block 510, the device management application of the mobile computing device implementing the method may register the mobile computing device with the notification server.

At block 520, the device management application of the mobile computing device implementing the method may receive a push notification message from a notification server. The message may include a payload identifying one or more mobile applications running on the mobile computing device. The payload may further include the notification properties, such as the text and/or image to be displayed by the mobile computing device, the sound to be reproduced by the mobile computing device, the vibration pattern to be reproduced by the mobile computing device, etc. The payload may further include identifier of an application-specific event to be detected and reported back to the workflow server. The payload may further specify one or more handlers to be utilized by the mobile applications for processing specified application-specific events (e.g., GUI events), as described in more detail herein above.

At block 530, the device management application may translate the payload into one or more local notifications addressed to one or more mobile applications running on the mobile computing device. Each local notification may include the application identifier (e.g., the URI), the notification properties, one or more handlers to be utilized by the mobile applications for processing specified application-specific events (e.g., GUI events), and/or an identifier of an application-specific event to be detected and reported back to the workflow server. The translation process may include parsing the payload and invoking one or more local application programming interface (API) calls for each object extracted from the payload, as described in more detail herein above. In various illustrative examples, operations of blocks 530 may be repeated for two or more local notifications.

At block 540, the device management application may cause one or more local notifications to be displayed on the mobile computing device. The visual presentation of the local notifications (e.g., color, text, pop-up alert, banner notification, icon badge, etc.) may be determined based on the local notification properties encoded by the local notification, as described in more detail herein above.

Responsive to receiving, at block 550, a user interface event associated with a displayed local notification, the device management application may, at block 560, process the user interface event by the handler specified for the event type by the local notification. In an illustrative example, responsive to detecting a touch event associated with the displayed local notification, the device management application may invoke a corresponding event handler (e.g., onTouch( )) specified by the local notification and supply one or more parameters which are encoded by the local notification (such as the URI for launching the associated mobile application), thus causing the mobile application to be launched or awakened.

Responsive to completing the operations of block 560, the method may terminate.

Figure 6:
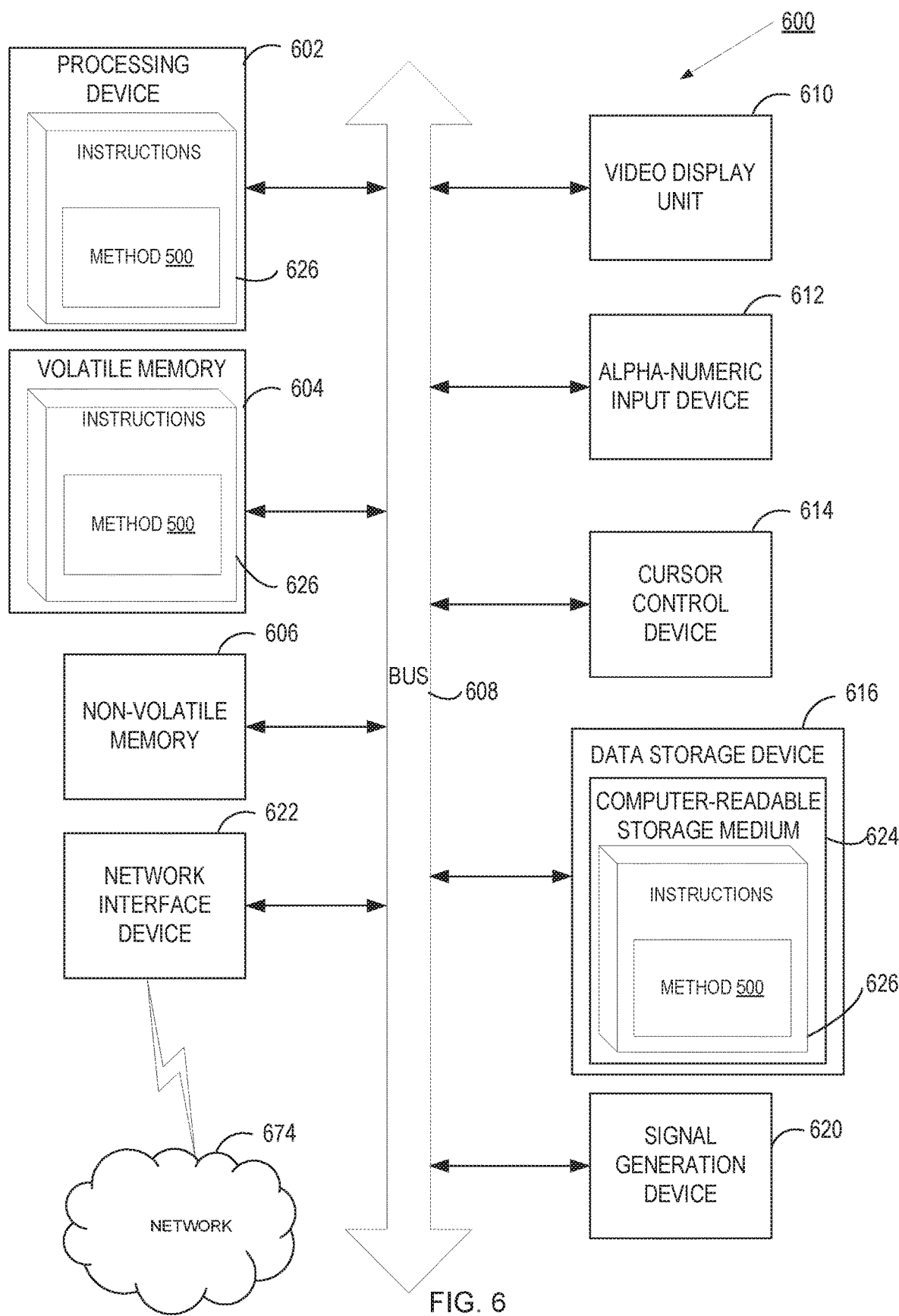
FIG. 6 depicts a block diagram of a computer system operating in accordance with one or more aspects of the present disclosure.

FIG. 6 depicts a block diagram of a computer system operating in accordance with one or more aspects of the present disclosure. In an illustrative example, computer system 600 may implement the functions of the mobile computing device 120 of FIG. 1. In another illustrative example, computer system 600 may implement the functions of the push notification server of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing method 500 of implementing server-driven notifications to mobile applications.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "detecting," "analyzing," "selecting," "building," "classifying," "updating," "optimizing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    transmitting, by a mobile computing device, a first message to a notification server to register the mobile computing device with the notification server, the first message comprising an identifier of the mobile computing device;
    receiving, by the mobile computing device, a second message from the notification server, wherein the second message comprises a payload identifying a mobile application running on the mobile computing device and an application-specific event associated with the mobile application;
    translating the payload into a local notification including an identifier of the mobile application, an identifier of the application-specific event, and one or more handlers to be utilized by the mobile application for processing the application-specific event;
    displaying the local notification on the mobile computing device;
    detecting the application-specific event in view of a user interface event associated with the local notification;
    processing the user interface event by a handler of the mobile application; and
    transmitting, to a workflow server associated with the mobile application, a notification indicating that the user interface event corresponding to the application-specific event was completed.

2. The method of claim 1, wherein the mobile application comprises a first mobile application and wherein the payload further identifies a second mobile application running on the mobile computing device.

3. The method of claim 2, further comprising:
    translating the payload into a second notification including a second identifier of the second mobile application;
    causing the second notification to be displayed on the mobile computing device; and
    responsive to receiving a second user interface event associated with the second notification, launching the second mobile application.

4. The method of claim 2, further comprising:
    responsive to detecting the application-specific event, translating the payload into a second notification including a second identifier of the second mobile application; and
    causing the second notification to be displayed on the mobile computing device.

5. The method of claim 1, wherein translating the payload further comprises:
    parsing the payload; and
    invoking one or more local application programming interface (API) calls for each object extracted from the payload.

6. A mobile computing device comprising:
a memory; and
a processor operatively coupled to the memory, the processor to:
transmit a first message to a notification server to register the mobile computing device with the notification server, the first message comprising an identifier of the mobile computing device;
receive a second message from a notification server, wherein the second message comprises a payload identifying a mobile application running on the mobile computing device and an application-specific event associated with the mobile application;
translate the payload into a local notification including an identifier of the mobile application, an identifier of the application-specific event, and one or more handlers to be utilized by the mobile application for processing the application-specific event;
display the local notification on the mobile computing device;
detecting the application-specific event in view of a user interface event associated with the local notification;
process the user interface event by a handler of the mobile application; and
transmit, to a workflow server associated with the mobile application, a notification indicating that the user interface event corresponding to the application-specific event was completed.

7. The mobile computing device of claim 6, wherein the mobile application comprises a first mobile application and wherein the payload further identifies a second mobile application running on the mobile computing device.

8. The mobile computing device of claim 7, wherein the processor is further to:
translate the payload into a second notification including a second identifier of the second mobile application;
cause the second notification to be displayed on the mobile computing device; and
responsive to receiving a second user interface event associated with the second notification, launch the second mobile application.

9. The mobile computing device of claim 7, wherein the processor is further to:
responsive to detecting the application-specific event, translate the payload into a second notification including a second identifier of the second mobile application; and
cause the second notification to be displayed on the mobile computing device.

10. The mobile computing device of claim 6, wherein translating the payload further comprises:
parse the payload; and
invoke one or more local application programming interface (API) calls for each object extracted from the payload.

11. A non-transitory computer-readable medium having executable instructions encoded thereon which, when executed by a processor, cause the processor to:
transmit a first message to a notification server to register a mobile computing device with the notification server, the first message comprising an identifier of the mobile computing device;
receive a second message from the notification server, wherein the second message comprises a payload identifying a mobile application running on the mobile computing device and an application-specific event associated with the mobile application;
translate the payload into a local notification including an identifier of the mobile application, an identifier of the application-specific event, and one or more handlers to be utilized by the mobile application for processing the application-specific event;
display the local notification on the mobile computing device;
detecting the application-specific event in view of a user interface event associated with the local notification;
process the user interface event by a handler of the mobile application; and
transmit, to a workflow server associated with a mobile application, a notification indicating that the user interface event corresponding to the application-specific event was completed.

12. The non-transitory computer-readable medium of claim 11, wherein the mobile application comprises a first mobile application and wherein the payload further identifies a second mobile application running on the mobile computing device.

13. The non-transitory computer-readable medium of claim 12, further comprising executable instructions causing the processor to:
translate the payload into a second notification including a second identifier of the second mobile application;
cause the second notification to be displayed on the mobile computing device; and
responsive to receiving a second user interface event associated with the second notification, launch the second mobile application.

14. The non-transitory computer-readable medium of claim 12, further comprising executable instructions causing the processor to:
responsive to detecting the application-specific event, translate the payload into a second notification including a second identifier of the second mobile application; and
cause the second notification to be displayed on the mobile computing device.

15. The non-transitory computer-readable medium of claim 11, wherein translating the payload further comprises:
parsing the payload; and
invoking one or more local application programming interface (API) calls for each object extracted from the payload.

16. The method of claim 1, wherein the application-specific event corresponds to a termination of the mobile application.

17. The mobile computing device of claim 6, wherein the application-specific event corresponds to a termination of the mobile application.

18. The non-transitory computer-readable medium of claim 12, wherein the application-specific event corresponds to a termination of the mobile application.

* * * * *

UNITED STATES PATENT AND TRADEMARK OFFICE
CERTIFICATE OF CORRECTION

| | |
|---|---|
| PATENT NO. | : 10,944,841 B2 |
| APPLICATION NO. | : 16/115772 |
| DATED | : March 9, 2021 |
| INVENTOR(S) | : Wojciech Julian Trocki |

It is certified that error appears in the above-identified patent and that said Letters Patent is hereby corrected as shown below:

On the Title Page

Item (72) Inventor name: Wojciech Trocki, Waterford City (IE) should read Wojciech Julian Trocki Signed and Sealed this
Twenty-eighth Day of February, 2023

Katherine Kelly Vidal
*Director of the United States Patent and Trademark Office*